No. 673,278. Patented Apr. 30, 1901.
C. H. MASON.
GRAIN DRILL.
(Application filed Feb. 21, 1901.)
(No Model.) 2 Sheets—Sheet 1.
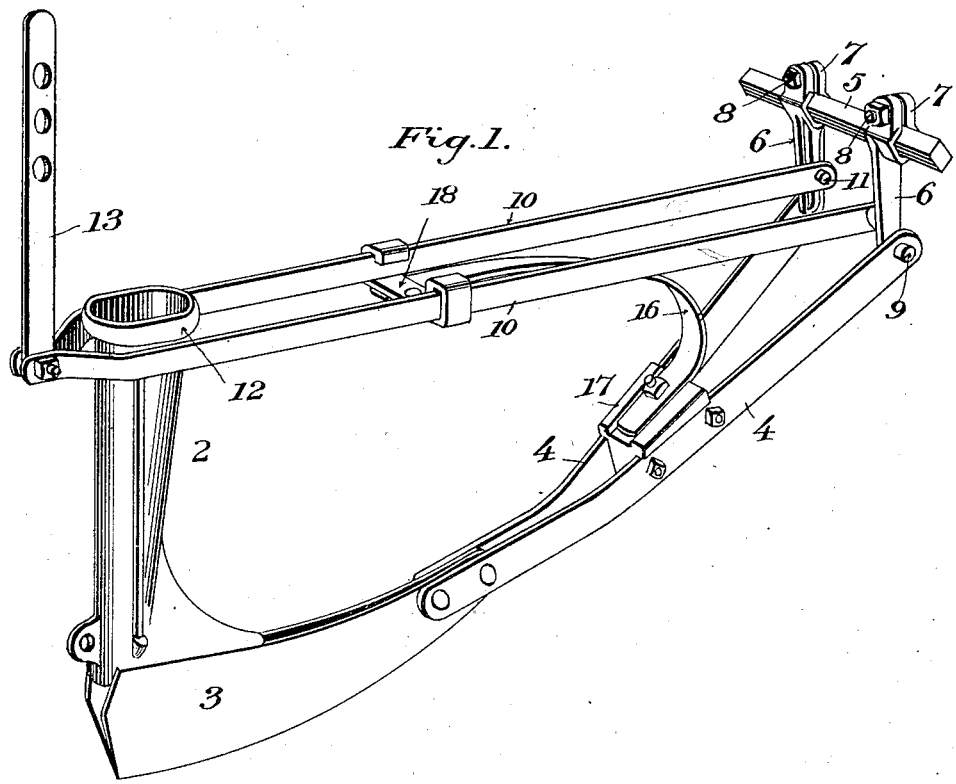
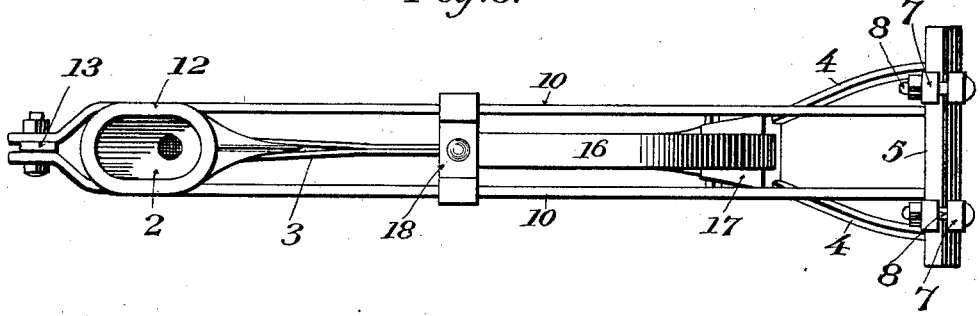
Witnesses  
Inventor  
Charles H. Mason  
By Philip T. Dodge  
Attorney No. 673,278. Patented Apr. 30, 1901.
C. H. MASON.
GRAIN DRILL.
(Application filed Feb. 21, 1901.)
(No Model.) 2 Sheets—Sheet 2.

Witnesses
F. A. Elmore
W. R. Kennedy

Inventor
Charles H. Mason
By Philip T. Dodge
Attorney

UNITED STATES PATENT OFFICE.

CHARLES H. MASON, OF SHORTSVILLE, NEW YORK, ASSIGNOR TO THE EMPIRE DRILL COMPANY, OF NEW YORK.

GRAIN-DRILL.

SPECIFICATION forming part of Letters Patent No. 673,278, dated April 30, 1901.

Application filed February 21, 1901. Serial No. 48,266. (No model.)

*To all whom it may concern:*

Be it known that I, CHARLES H. MASON, of Shortsville, county of Ontario, and State of New York, have invented a new and useful Improvement in Grain-Drills, of which the following is a specification.

This invention has reference to grain-drills, and relates more particularly to the mechanism for applying a spring-pressure to the runners or furrow-openers.

The invention consists in various improvements in the mechanism for this purpose, having in view simplicity of construction, effectiveness in operation, and economy in production.

The invention consists also in the details of construction and combination of parts hereinafter described and claimed.

Figure 2:
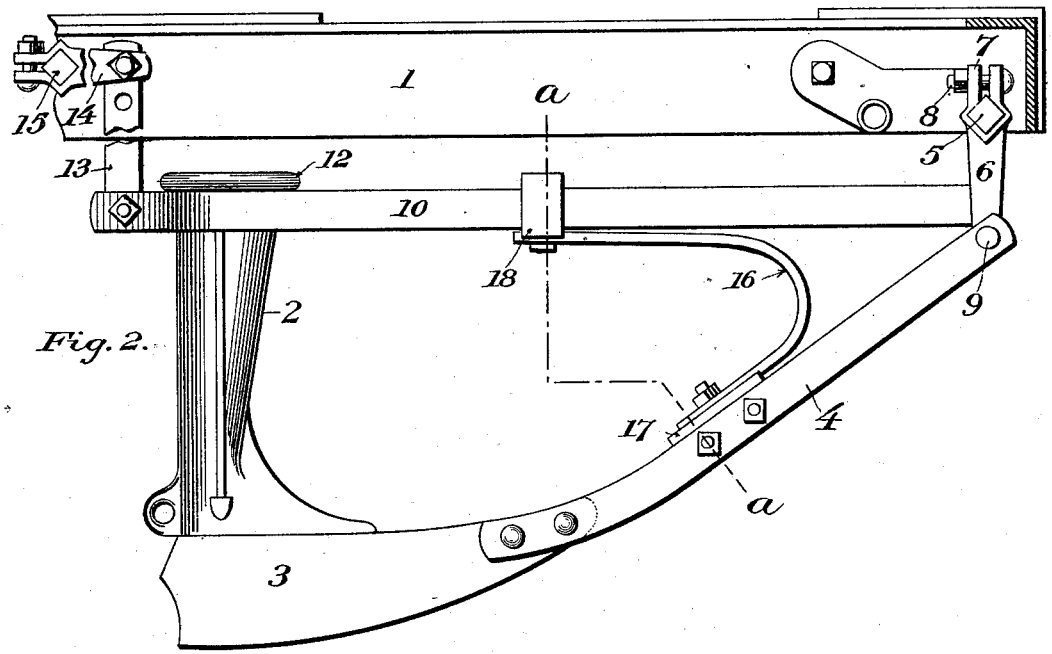
Figure 4:
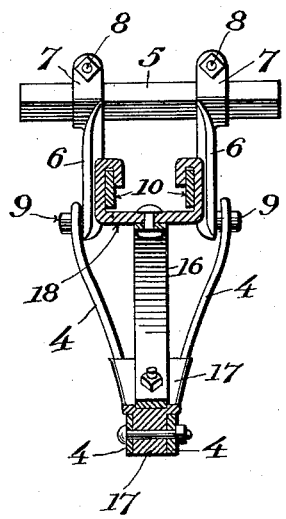

In the accompanying drawings, Figure 1 is a perspective view of a furrow-opener and its connected drag-bars, showing my improved depressing mechanism applied thereto. Fig. 2 is a side elevation of the same, showing its connection with the frame of the machine. Fig. 3 is a top plan view of the furrow-opener and operating mechanism. Fig. 4 is a transverse vertical sectional elevation on the line *a a* of Fig. 2 looking forward.

Referring to the drawings, 1 represents the frame of the machine, which is of rectangular form and is adapted to give support to the usual seed-hopper, (not shown,) from which the seed is discharged into seed-tubes 2, arranged at intervals beneath the hopper. The seed-tubes are connected at their lower ends to the rear ends of runners or furrow-openers 3, from the forward ends of which are two drag-bars 4, extending upwardly and forwardly to the front of the frame, to which they are connected in the manner presently to be described.

The foregoing parts may be of the usual and ordinary construction, and except in so far as hereinafter indicated they form no part of the present invention.

In applying my invention I extend along the front of the frame a short distance in the rear of its front edge a horizontal bar 5, angular in cross-section, and as a means of connecting the drag-bars to this horizontal bar I provide the latter at intervals with depending arms 6, each with its upper end in the form of a clip 7, embracing the bar and held adjustably thereon by clamping-bolts 8, so that they may be adjusted laterally along the bar as occasion may demand. At their lower ends the arms are each provided with an outwardly-extending lug or pin 9, by means of which the drag-bars are pivotally connected therewith, the bars being provided with holes to receive the said pins.

From this description it will be observed that the connected seed-tubes, furrow-openers, and drag-bars are arranged in gang side by side and pivotally connected with the frame at their forward ends, the result being that the runners may be raised or lowered in the usual manner to vary the depth of the planting.

In order that the runners may be held in the ground yieldingly, so as to readily override obstructions and follow inaccuracies in the level, I provide for each a depressing mechanism of improved construction, and as these several mechanisms for the gang of runners are identical a description of one will suffice. The mechanism comprises two stiff parallel pressure-bars 10, each formed in its forward end with a hole loosely encircling pivot pins or lugs 11, extending inwardly from the inner side of the arms 6 some distance above the outwardly-extending pins 9. At their rear ends the pressure-bars extend on opposite sides of the seed-tube and beneath an annular shoulder 12 on its upper edge, in the rear of which they are pivoted to the lower end of a vertical link 13, jointed at its upper end to an arm 14, extending forwardly from a rock-shaft 15, mounted on the frame, the arrangement being such that by the rocking of the shaft the rear ends of the pressure-bars may be raised or lowered. About midway of their length the pressure-bars act on the upper end of a U-shaped flat pressure-spring 16, firmly fixed at its lower end to a block 17, secured between the drag-bars. From this point the spring curves forwardly, upwardly, and rearwardly and has its upper end fixed to a plate 18, bearing beneath the pressure-bars and engaging over their upper edges, as shown in Fig. 4, so that while the plate may slide along the bars it cannot be separated from the same.

As a result of the construction described when the bars are depressed by the rocking of the shaft 15 they will, through the medium of the spring, depress the runners with a yielding action, the plate 18 permitting a free relative movement between the spring and pressure-bars. When the bars are elevated to lift the runners, they engage beneath the annular shoulder on the seed-tube and positively lift the same, the parts turning on the connection of the drag-bars with the arms as an axis.

It will be observed that the spring 16 is sustained wholly by the drag-bars and distant from their axis. Hence when the bars are depressed there will be a relative movement between the same and the plate 18, the latter moving in a vertical line, while the bars will move in the arc of a circle.

While the operation of the rock-shaft will serve to elevate or depress all the runners simultaneously and while they are held in action by the locking of said shaft, each is permitted to yield or move vertically or independently subject to the pressure of its spring.

It will be understood that other means than those shown of elevating and depressing the pressure-bars may be employed and that other means than the engagement of the pressure-bars with the seed-tube for elevating the runners may be employed without departing from the limits of my invention, the essence of which resides in the novel combination of the pressure-bars, the drag-bars, and the intermediate spring and the improved arrangement of the same.

Having thus described my invention, what I claim is—

1. In combination with the frame, drag-bars jointed to the same to swing vertically, a pressure-bar movable vertically above the drag-bars, an intermediate spring sustained wholly by one of said members distant from its axis, and having a sliding contact with the other member, and means for depressing the pressure-bars.

2. In combination with the frame, drag-bars jointed thereto to swing vertically, a pressure-bar movable vertically above the drag-bars, an intermediate spring sustained wholly by the drag-bars distant from their axis and bearing on the pressure-bars, and means for depressing the pressure-bars.

3. In combination with the frame, drag-bars pivoted at their forward ends thereto and movable vertically, pressure-bars jointed at their forward ends adjacent to the axis of the drag-bars, a flat spring sustained by the drag-bars distant from their axis and curved upwardly, forwardly and rearwardly and engaging beneath the pressure-bars, and means for depressing the latter.

4. In combination with the frame, a furrow-opener, two drag-bars extending forwardly and upwardly therefrom and jointed at their forward ends to swing vertically, a block fixed between the drag-bars, a spring having its lower end fixed to the block, a pressure-bar movable vertically above the drag-bars and having a bearing on the spring, and means for depressing the pressure-bars.

5. In combination with the vertically-movable drag-bars, the vertically-movable pressure-bar above the same, and a spring sustained by the drag-bar with its upper end slidingly connected with the pressure-bar and means for depressing the pressure-bar.

6. In combination with the vertically-movable drag-bars, the vertically-movable pressure-bars above the same, a spring sustained at one end by the drag-bars, a plate on the other end of the spring bearing against the under sides of the pressure-bars and engaging over the upper edges of the same.

7. The combination with the frame, of a supporting-bar, arms sustained by the bar and adjustable along the same, drag-bars pivoted at their forward ends to the arms, pressure-bars also pivoted to said arms, an intermediate spring, and means for depressing the pressure-bars.

8. The combination with the frame of arms sustained thereby, drag-bars jointed to the outer sides of said arms, pressure-bars jointed to the inner sides of said arms, an intermediate spring, and means for depressing the pressure-bars.

9. The combination with the frame, of arms sustained thereby and provided on their outer and inner sides with projecting lugs, drag-bars provided in their forward ends with holes loosely encircling the outer lugs, pressure-bars formed in their forward ends with holes loosely encircling the inner lugs, an intermediate spring, and means for depressing the pressure-bars.

10. The combination with the frame of depending arms, drag-bars pivoted at their forward ends to said arms, pressure-bars also pivoted at their forward ends to said arms above the axis of the drag-bars, an intermediate spring, and means for depressing the pressure-bars.

In testimony whereof I hereunto set my hand, this 5th day of February, 1901, in the presence of two attesting witnesses.

CHARLES H. MASON.

Witnesses:
HENRY O. KLEUCK,
MILAN E. GOODRICH.